(12) United States Patent
Lundberg et al.

(10) Patent No.: US 12,380,525 B2
(45) Date of Patent: Aug. 5, 2025

(54) PATENT MAPPING

(71) Applicant: Lucid Patent LLC, Minneapolis, MN (US)

(72) Inventors: Steven W. Lundberg, Edina, MN (US); Janal M. Kalis, Minneapolis, MN (US); Pradeep Sinha, Medina, MN (US)

(73) Assignee: Lucid Patent LLC, Minneapolis, MN (US)

( * ) Notice: Subject to any disclaimer, the term of this patent is extended or adjusted under 35 U.S.C. 154(b) by 0 days.

(21) Appl. No.: 18/238,325

(22) Filed: Aug. 25, 2023

(65) Prior Publication Data

US 2024/0095867 A1    Mar. 21, 2024

Related U.S. Application Data

(60) Continuation of application No. 17/364,554, filed on Jun. 30, 2021, now Pat. No. 11,776,084, which is a
(Continued)

(51) Int. Cl.
*G06F 7/00* (2006.01)
*G06F 40/143* (2020.01)
(Continued)

(52) U.S. Cl.
CPC .......... *G06Q 99/00* (2013.01); *G06F 40/143* (2020.01); *G06F 40/30* (2020.01); *G06Q 50/184* (2013.01); *G06F 16/86* (2019.01)

(58) Field of Classification Search
CPC ...... G06F 16/86; G06F 16/93; G06F 16/3344; G06F 16/80; G06F 16/9538; G06F 16/951; G06F 16/382; G06F 40/30; G06F 40/143; G06F 40/131; G06F 40/137; G06F 40/237; G06F 40/169; G06F 40/197; G06F 40/247; G06Q 50/184; G06Q 99/00

See application file for complete search history.

(56) References Cited

U.S. PATENT DOCUMENTS

| | | |
|---|---|---|
| 4,807,154 A | 2/1989 | Scully et al. |
| 4,868,733 A | 9/1989 | Fujisawa et al. |

(Continued)

FOREIGN PATENT DOCUMENTS

| | | |
|---|---|---|
| AU | 2006272510 | 2/2012 |
| AU | 2012200701 B2 | 5/2014 |

(Continued)

OTHER PUBLICATIONS

"U.S. Appl. No. 10/710,656, Non Final Office Action mailed Jan. 17, 2007", 16 pgs.
(Continued)

*Primary Examiner* — Mohammad A Sana
(74) *Attorney, Agent, or Firm* — Schwegman Lundberg & Woessner, P.A.

(57) ABSTRACT

The present inventive subject matter provides systems, methods, software, and data structures for patent mapping, storage, and searching. Some such embodiments include mapping patent documents, claims, and claim limitations. Some further embodiments provide for searching a universe of patent documents by patent document, claim, limitation, class, element, or concept.

20 Claims, 6 Drawing Sheets

Related U.S. Application Data continuation of application No. 15/610,332, filed on May 31, 2017, now Pat. No. 11,080,807, which is a continuation of application No. 12/958,113, filed on Dec. 1, 2010, now Pat. No. 9,697,577, which is a division of application No. 10/915,265, filed on Aug. 10, 2004, now abandoned.

(51) Int. Cl.
*G06F 40/30* (2020.01)
*G06Q 50/18* (2012.01)
*G06Q 99/00* (2006.01)
*G06F 16/84* (2019.01)

(56) References Cited

U.S. PATENT DOCUMENTS

| | | |
|---|---|---|
| 5,297,039 A | 3/1994 | Kanaegami et al. |
| 5,329,447 A | 7/1994 | Leedom, Jr. |
| 5,404,506 A | 4/1995 | Fujisawa et al. |
| 5,410,646 A | 4/1995 | Tondevold et al. |
| 5,530,852 A | 6/1996 | Meske et al. |
| 5,548,506 A | 8/1996 | Srinivasan |
| 5,548,753 A | 8/1996 | Linstead et al. |
| 5,553,226 A | 9/1996 | Kiuchi et al. |
| 5,555,408 A | 9/1996 | Fujisawa et al. |
| 5,557,515 A | 9/1996 | Abbruzzese et al. |
| 5,592,664 A | 1/1997 | Starkey |
| 5,623,679 A | 4/1997 | Rivette et al. |
| 5,623,681 A | 4/1997 | Rivette et al. |
| 5,644,740 A | 7/1997 | Kiuchi |
| 5,659,729 A | 8/1997 | Nielsen |
| 5,664,063 A | 9/1997 | Johnson et al. |
| 5,664,714 A | 9/1997 | Navarro et al. |
| 5,694,523 A | 12/1997 | Wical |
| 5,696,916 A | 12/1997 | Yamazaki et al. |
| 5,699,528 A | 12/1997 | Hogan |
| 5,721,910 A | 2/1998 | Unger et al. |
| 5,745,745 A | 4/1998 | Tada et al. |
| 5,754,840 A | 5/1998 | Rivette et al. |
| 5,758,328 A | 5/1998 | Giovannoli |
| 5,768,580 A | 6/1998 | Wical |
| 5,774,833 A | 6/1998 | Newman |
| 5,787,411 A | 7/1998 | Groff et al. |
| 5,794,236 A | 8/1998 | Mehrle |
| 5,799,325 A | 8/1998 | Rivette et al. |
| 5,809,318 A | 9/1998 | Rivette et al. |
| 5,850,520 A | 12/1998 | Greibenow et al. |
| 5,870,745 A | 2/1999 | McCune |
| 5,895,468 A | 4/1999 | Whitmyer, Jr. |
| 5,903,881 A | 5/1999 | Schrader et al. |
| 5,907,837 A | 5/1999 | Ferrel et al. |
| 5,940,821 A | 8/1999 | Wical |
| 5,953,726 A | 9/1999 | Carter et al. |
| 5,970,463 A | 10/1999 | Cave et al. |
| 5,991,751 A | 11/1999 | Rivette et al. |
| 5,991,756 A | 11/1999 | Wu |
| 5,991,780 A | 11/1999 | Rivette et al. |
| 6,006,221 A | 12/1999 | Liddy et al. |
| 6,014,663 A | 1/2000 | Rivette et al. |
| 6,038,561 A | 3/2000 | Snyder et al. |
| 6,049,801 A | 4/2000 | Whitmyer, Jr. |
| 6,055,538 A | 4/2000 | Kessenich et al. |
| 6,076,088 A | 6/2000 | Paik et al. |
| 6,182,062 B1 | 1/2001 | Fujisawa et al. |
| 6,182,078 B1 | 1/2001 | Whitmyer, Jr. |
| 6,216,128 B1 | 4/2001 | Di-Criescenzo et al. |
| 6,226,792 B1 | 5/2001 | Goiffon et al. |
| 6,263,335 B1 | 7/2001 | Paik et al. |
| 6,327,593 B1 | 12/2001 | Goiffon |
| 6,339,767 B1 | 1/2002 | Rivette et al. |
| 6,363,361 B1 | 3/2002 | Lundberg |
| 6,415,319 B1 | 7/2002 | Ambroziak |
| 6,453,312 B1 | 9/2002 | Goiffon et al. |
| 6,499,026 B1 | 12/2002 | Rivette et al. |
| 6,502,081 B1 | 12/2002 | Wiltshire, Jr. et al. |
| 6,574,632 B2 | 6/2003 | Fox et al. |
| 6,662,178 B2 | 12/2003 | Lee |
| 6,665,670 B2 | 12/2003 | Winer et al. |
| 6,675,159 B1 | 1/2004 | Lin et al. |
| 6,678,692 B1 | 1/2004 | Hyatt |
| 6,694,331 B2 | 2/2004 | Lee |
| 6,751,621 B1 | 6/2004 | Calistri-Yeh et al. |
| 6,823,331 B1 | 11/2004 | Abu-Hakima |
| 6,847,966 B1 | 1/2005 | Sommer et al. |
| 6,847,979 B2 | 1/2005 | Allemang et al. |
| 6,885,999 B1 | 4/2005 | Corless |
| 6,889,223 B2 | 5/2005 | Hattori et al. |
| 6,941,553 B2 | 9/2005 | Eisler et al. |
| 6,970,842 B1 | 11/2005 | Ashby |
| 6,970,881 B1 | 11/2005 | Mohan et al. |
| 6,976,016 B2 | 12/2005 | Chang |
| 6,980,984 B1 | 12/2005 | Huffman et al. |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,035,463 B1 | 4/2006 | Monobe et al. |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,158,983 B2 | 1/2007 | Willse et al. |
| 7,231,384 B2 | 6/2007 | Wu et al. |
| 7,231,386 B2 | 6/2007 | Nonomura et al. |
| 7,293,018 B2 | 11/2007 | Hattori et al. |
| 7,296,015 B2 | 11/2007 | Poltorak |
| 7,369,701 B2 | 5/2008 | Lundberg |
| 7,493,253 B1 | 2/2009 | Ceusters et al. |
| 7,523,126 B2 | 4/2009 | Rivette et al. |
| 7,680,733 B1 | 3/2010 | Lundberg |
| 7,716,226 B2 | 5/2010 | Barney |
| 7,757,168 B1* | 7/2010 | Shanahan .............. G06F 16/93 715/201 |
| 7,881,937 B2 | 2/2011 | Hasan et al. |
| 7,966,328 B2 | 6/2011 | Germeraad et al. |
| 7,996,753 B1 | 8/2011 | Chan et al. |
| 8,078,545 B1 | 12/2011 | Zilka et al. |
| 8,161,025 B2 | 4/2012 | Lundberg et al. |
| 8,442,814 B2 | 5/2013 | Ceusters et al. |
| 8,589,413 B1 | 11/2013 | Mohan et al. |
| 8,812,292 B2 | 8/2014 | Ceusters et al. |
| 9,201,956 B2 | 12/2015 | Lundberg et al. |
| 9,541,977 B1* | 1/2017 | Lee .................... G05B 13/025 |
| 9,659,071 B2 | 5/2017 | Lundberg et al. |
| 9,697,577 B2 | 7/2017 | Lundberg et al. |
| 11,080,807 B2 | 8/2021 | Lundberg et al. |
| 11,776,084 B2 | 10/2023 | Lundberg et al. |
| 2001/0007977 A1 | 7/2001 | Geary |
| 2001/0027452 A1* | 10/2001 | Tropper ............... G06F 16/382 |
| 2001/0049688 A1 | 12/2001 | Fratkina et al. |
| 2002/0007373 A1 | 1/2002 | Blair et al. |
| 2002/0022974 A1 | 2/2002 | Lindh |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0052971 A1 | 5/2002 | Okudera et al. |
| 2002/0065675 A1 | 5/2002 | Grainger et al. |
| 2002/0065677 A1 | 5/2002 | Grainger et al. |
| 2002/0091541 A1 | 7/2002 | Lundberg |
| 2002/0091702 A1 | 7/2002 | Mullins |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0138465 A1 | 9/2002 | Lee et al. |
| 2002/0138474 A1 | 9/2002 | Lee |
| 2002/0138475 A1 | 9/2002 | Lee |
| 2002/0143742 A1 | 10/2002 | Nonomura et al. |
| 2002/0147711 A1 | 10/2002 | Hattori et al. |
| 2002/0147738 A1 | 10/2002 | Reader et al. |

(56) References Cited

U.S. PATENT DOCUMENTS

| | | |
|---|---|---|
| 2002/0161733 A1 | 10/2002 | Grainger |
| 2002/0163541 A1 | 11/2002 | Williams et al. |
| 2002/0174131 A1 | 11/2002 | Winer et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |
| 2003/0046307 A1 | 3/2003 | Rivette et al. |
| 2003/0050915 A1 | 3/2003 | Allemang et al. |
| 2003/0074354 A1 | 4/2003 | Lee et al. |
| 2003/0084066 A1 | 5/2003 | Waterman et al. |
| 2003/0115191 A1 | 6/2003 | Copperman et al. |
| 2003/0154085 A1 | 8/2003 | Kelley |
| 2003/0167181 A1 | 9/2003 | Lundberg et al. |
| 2003/0191780 A1 | 10/2003 | Heger et al. |
| 2003/0195764 A1 | 10/2003 | Baker et al. |
| 2003/0212706 A1 | 11/2003 | Shih |
| 2003/0217335 A1 | 11/2003 | Chung et al. |
| 2003/0220891 A1 | 11/2003 | Fish |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0064438 A1 | 4/2004 | Kostoff |
| 2004/0078192 A1 | 4/2004 | Poltorak |
| 2004/0078365 A1* | 4/2004 | Poltorak ............... G06F 40/205 |
| 2004/0083206 A1 | 4/2004 | Wu et al. |
| 2004/0088332 A1 | 5/2004 | Lee et al. |
| 2004/0103112 A1 | 5/2004 | Colson et al. |
| 2004/0122841 A1 | 6/2004 | Goodman et al. |
| 2004/0133566 A1 | 7/2004 | Ishiguro et al. |
| 2004/0167875 A1 | 8/2004 | Sneiders |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186705 A1 | 9/2004 | Morgan et al. |
| 2004/0186738 A1 | 9/2004 | Reisman |
| 2004/0199400 A1 | 10/2004 | Lundberg |
| 2004/0260569 A1 | 12/2004 | Bell et al. |
| 2004/0268399 A1 | 12/2004 | Asakawa |
| 2005/0004806 A1 | 1/2005 | Lin et al. |
| 2005/0005239 A1 | 1/2005 | Richards et al. |
| 2005/0010555 A1 | 1/2005 | Gallivan |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0097628 A1 | 5/2005 | Lussier et al. |
| 2005/0108652 A1 | 5/2005 | Beretich, Jr. et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0131882 A1 | 6/2005 | Beretich et al. |
| 2005/0144177 A1* | 6/2005 | Hodes .................. G06F 40/237 |
| 2005/0154673 A1 | 7/2005 | Fellenstein et al. |
| 2005/0165600 A1 | 7/2005 | Kasravi et al. |
| 2005/0182755 A1 | 8/2005 | Tran |
| 2005/0198026 A1 | 9/2005 | Dehlinger et al. |
| 2005/0203768 A1 | 9/2005 | Florance et al. |
| 2005/0210008 A1 | 9/2005 | Tran et al. |
| 2005/0210009 A1 | 9/2005 | Tran |
| 2005/0210042 A1 | 9/2005 | Goedken |
| 2005/0216898 A1* | 9/2005 | Powell .................. G06F 16/80 |
| | | 717/114 |
| 2005/0228684 A1 | 10/2005 | Pogodin et al. |
| 2005/0234738 A1 | 10/2005 | Hodes |
| 2005/0234881 A1 | 10/2005 | Burago et al. |
| 2005/0246194 A1 | 11/2005 | Lundberg |
| 2005/0251383 A1 | 11/2005 | Murray |
| 2005/0256734 A1 | 11/2005 | Clikeman |
| 2005/0289524 A1 | 12/2005 | McGinnes |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074836 A1 | 4/2006 | Gardner et al. |
| 2006/0074991 A1 | 4/2006 | Lussier et al. |
| 2006/0085478 A1 | 4/2006 | Landau et al. |
| 2006/0106793 A1 | 5/2006 | Liang |
| 2006/0106847 A1 | 5/2006 | Eckardt, III et al. |
| 2006/0112084 A1 | 5/2006 | Mcbeath et al. |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212402 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0225000 A1 | 10/2006 | Albrecht et al. |
| 2006/0235811 A1 | 10/2006 | Fairweather |
| 2006/0258397 A1 | 11/2006 | Kaplan et al. |
| 2006/0287971 A1 | 12/2006 | Armstrong |
| 2007/0057967 A1 | 3/2007 | Armstrong |
| 2007/0061384 A1 | 3/2007 | Harrington et al. |
| 2007/0067297 A1 | 3/2007 | Kublickis |
| 2007/0073748 A1 | 3/2007 | Barney |
| 2007/0130112 A1 | 6/2007 | Lin |
| 2007/0136116 A1 | 6/2007 | Germeraad et al. |
| 2007/0174041 A1 | 7/2007 | Yeske |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0288256 A1 | 12/2007 | Speier |
| 2008/0005103 A1 | 1/2008 | Ratcliffe et al. |
| 2008/0016069 A1 | 1/2008 | Holt |
| 2008/0077570 A1 | 3/2008 | Tang et al. |
| 2008/0104032 A1 | 5/2008 | Sarkar |
| 2008/0154848 A1 | 6/2008 | Haslam et al. |
| 2008/0195601 A1 | 8/2008 | Ntoulas et al. |
| 2008/0216013 A1 | 9/2008 | Lundberg et al. |
| 2008/0306952 A1 | 12/2008 | Lynn et al. |
| 2009/0083049 A1 | 3/2009 | Sciarrino et al. |
| 2009/0157717 A1 | 6/2009 | Palahnuk et al. |
| 2009/0228578 A1 | 9/2009 | Demers et al. |
| 2009/0259459 A1 | 10/2009 | Ceusters et al. |
| 2009/0282054 A1 | 11/2009 | Casey |
| 2010/0005094 A1 | 1/2010 | Poltorak |
| 2010/0023386 A1 | 1/2010 | Avisar et al. |
| 2010/0082395 A1 | 4/2010 | De Andrade |
| 2010/0131513 A1 | 5/2010 | Lundberg et al. |
| 2010/0174698 A1 | 7/2010 | Odland et al. |
| 2010/0235337 A1 | 9/2010 | Shanahan et al. |
| 2011/0029476 A1 | 2/2011 | Kasravi et al. |
| 2011/0055192 A1 | 3/2011 | Tang et al. |
| 2011/0072014 A1 | 3/2011 | Lundberg et al. |
| 2011/0099084 A1 | 4/2011 | Horn et al. |
| 2011/0153509 A1 | 6/2011 | Lundberg et al. |
| 2011/0179032 A1 | 7/2011 | Ceusters et al. |
| 2011/0231449 A1 | 9/2011 | Ashley et al. |
| 2011/0246473 A1 | 10/2011 | Stec |
| 2011/0289096 A1 | 11/2011 | Barney |
| 2011/0320582 A1 | 12/2011 | Lewis |
| 2012/0096027 A1 | 4/2012 | Coult |
| 2012/0109642 A1 | 5/2012 | Stobbs et al. |
| 2012/0116989 A1 | 5/2012 | Lai et al. |
| 2012/0130993 A1 | 5/2012 | Lundberg et al. |
| 2012/0174017 A1 | 7/2012 | Tidwell et al. |
| 2012/0240026 A1 | 9/2012 | Iyer et al. |

(56) References Cited

U.S. PATENT DOCUMENTS

| | | |
|---|---|---|
| 2012/0284199 A1 | 11/2012 | Lundberg |
| 2013/0086045 A1 | 4/2013 | Lundberg |
| 2013/0086070 A1 | 4/2013 | Lundberg |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0379388 A1 | 12/2014 | Lundberg et al. |
| 2015/0134549 A1 | 5/2015 | Lundberg et al. |
| 2016/0078109 A1 | 3/2016 | Lundberg et al. |
| 2018/0068409 A1 | 3/2018 | Lundberg et al. |
| 2021/0407033 A1 | 12/2021 | Lundberg et al. |

FOREIGN PATENT DOCUMENTS

| | | |
|---|---|---|
| AU | 2013270517 B2 | 4/2016 |
| EP | 0638870 A1 | 2/1995 |
| GB | 2156112 A | 10/1985 |
| GB | 2260007 A | 3/1993 |
| WO | WO-9816890 A1 | 4/1998 |
| WO | WO-02080039 A1 | 10/2002 |
| WO | WO-2006015110 A2 | 2/2006 |
| WO | WO-2006015110 A3 | 2/2006 |
| WO | WO-2006128183 A2 | 11/2006 |
| WO | WO-2006128183 A3 | 11/2006 |
| WO | WO-2007014341 A2 | 2/2007 |
| WO | WO-2007014341 A3 | 2/2007 |
| WO | WO-2007014341 C2 | 2/2007 |

OTHER PUBLICATIONS

"U.S. Appl. No. 10/710,656, Response filed Nov. 13, 2006 to Restriction Requirement mailed Oct. 13, 2006", 6 pgs.
"U.S. Appl. No. 10/710,656, Restriction Requirement mailed Oct. 13, 2006", 9 pgs.
"U.S. Appl. No. 10/915,265, Advisory Action mailed Jul. 31, 2008", 3 pgs.
"U.S. Appl. No. 10/915,265, Final Office Action mailed Jul. 10, 2007", 26 pgs.
"U.S. Appl. No. 10/915,265, Final Office Action mailed Jul. 14, 2008", 23 pgs.
"U.S. Appl. No. 10/915,265, Non Final Office Action mailed Jan. 22, 2007", 15 pgs.
"U.S. Appl. No. 10/915,265, Non-Final Office Action mailed Apr. 13, 2009", 27 pgs.
"U.S. Appl. No. 10/915,265, Non-Final Office Action mailed Jun. 2, 2010", 29 pgs.
"U.S. Appl. No. 10/915,265, Non-Final Office Action mailed Nov. 5, 2008", 27 pgs.
"U.S. Appl. No. 10/915,265, Non-Final Office Action mailed Dec. 28, 2007", 25 pgs.
"U.S. Appl. No. 10/915,265, Response filed Feb. 5, 2009 to Non-Final Office Action mailed Nov. 5, 2008", 11 pgs.
"U.S. Appl. No. 10/915,265, Response filed Mar. 15, 2010 to Non-Final Office Action mailed Apr. 13, 2009", 11 pgs.
"U.S. Appl. No. 10/915,265, Response filed Apr. 28, 2008 to Non-Final Office Action mailed Dec. 28, 2007", 14 pgs.
"U.S. Appl. No. 10/915,265, Response filed May 18, 2007 to Noon Final Office Action mailed Jan. 22, 2007", 9 pgs.
"U.S. Appl. No. 10/915,265, Response filed Jul. 18, 2008 to Final Office Action mailed Jul. 14, 2008", 17 pgs.
"U.S. Appl. No. 10/915,265, Response filed Sep. 1, 2010 to Non Final Office Action mailed Jun. 2, 2010", 12 pgs.
"U.S. Appl. No. 10/915,265, Response filed Oct. 10, 2007 to Final Office Action filed Jul. 10, 2007", 15 pgs.
"U.S. Appl. No. 10/915,265, Response filed Nov. 13, 2006 to Restriction Requirement mailed Oct. 11, 2006", 5 pgs.
"U.S. Appl. No. 10/915,265, Restriction Requirement mailed Oct. 13, 2006", 10 pgs.
"U.S. Appl. No. 11/494,278, Final Office Action mailed Mar. 23, 2009", 21 pgs.
"U.S. Appl. No. 11/494,278, Final Office Action mailed Apr. 1, 2010", 20 pgs.
"U.S. Appl. No. 11/494,278, Non Final Office Action mailed Oct. 8, 2009", 21 pgs.
"U.S. Appl. No. 11/494,278, Non-Final Office Action mailed Mar. 5, 2008", 14 pgs.
"U.S. Appl. No. 11/494,278, Notice of Allowance mailed May 3, 2011", 12 pgs.
"U.S. Appl. No. 11/494,278, Notice of Allowance mailed Dec. 15, 2011", 14 pgs.
"U.S. Appl. No. 11/494,278, Notice of Non-Compliant Amendment mailed Jun. 7, 2010", 2 pgs.
"U.S. Appl. No. 11/494,278, Preliminary Amendment filed Oct. 30, 2007", 6 pgs.
"U.S. Appl. No. 11/494,278, Response filed Feb. 10, 2010 to Non Final Office Action mailed Oct. 8, 2009", 8 pgs.
"U.S. Appl. No. 11/494,278, Response filed Jun. 2, 2010 to Final Office Action mailed Apr. 1, 2010", 7 pgs.
"U.S. Appl. No. 11/494,278, Response filed Jun. 5, 2008 to Non-Final Office Action mailed Mar. 5, 2008", 12 pgs.
"U.S. Appl. No. 11/494,278, Response filed Jun. 9, 2010 to Notice of Non-Compliant Amendment mailed Jun. 7, 2010", 7 pgs.
"U.S. Appl. No. 11/494,278, Response filed Jun. 23, 2009 to Final Office Action mailed Mar. 23, 2009", 8 pgs.
"U.S. Appl. No. 11/888,632, Amendment filed Jun. 12, 2012", 8 pgs.
"U.S. Appl. No. 11/888,632, Appeal Brief filed Jun. 4, 2015", 16 pgs.
"U.S. Appl. No. 11/888,632, Decision on Pre-Appeal Brief mailed Mar. 9, 2012", 2 pgs.
"U.S. Appl. No. 11/888,632, Final Office Action mailed Sep. 8, 2014", 12 pgs.
"U.S. Appl. No. 11/888,632, Final Office Action mailed Oct. 19, 2011", 9 pgs.
"U.S. Appl. No. 11/888,632, Non Final Office Action mailed Jan. 19, 2011", 12 pgs.
"U.S. Appl. No. 11/888,632, Non Final Office Action mailed Jan. 24, 2014", 12 pgs.
"U.S. Appl. No. 11/888,632, Pre-Appeal Brief Request filed Feb. 21, 2012", 4 pgs.
"U.S. Appl. No. 11/888,632, Response filed Jun. 24, 2014 to Non Final Office Action mailed Jan. 24, 2014", 9 pgs.
"U.S. Appl. No. 11/888,632, Response filed Jul. 19, 2011 to Non Final Office Action mailed Jan. 19, 2011", 8 pgs.
"U.S. Appl. No. 11/888,632, Response filed Dec. 7, 2010, to Restriction Requirement mailed Jul. 7, 2010", 7 pgs.
"U.S. Appl. No. 11/888,632, Restriction Requirement mailed Jul. 7, 2010", 5 pgs.
"U.S. Appl. No. 11/915,718, Advisory Action Mailed Feb. 15, 2012", 3 pgs.
"U.S. Appl. No. 11/915,718, Final Office Action Mailed Dec. 30, 2011", 13 pgs.
"U.S. Appl. No. 11/915,718, Non Final Office Action mailed May 26, 2011", 9 pgs.
"U.S. Appl. No. 11/915,718, Non Final Office Action mailed Jul. 7, 2014", 17 pgs.
"U.S. Appl. No. 11/915,718, Notice of Non-Compliant Amendment mailed Oct. 6, 2011", 2 pgs.
"U.S. Appl. No. 11/915,718, Preliminary Amendment filed Nov. 27, 2007", 2 pgs.
"U.S. Appl. No. 11/915,718, Response filed Feb. 8, 2012 to Final Office Action mailed Dec. 30, 2011", 13 pgs.
"U.S. Appl. No. 11/915,718, Response filed Sep. 26, 2011 to Non-Final Office Action mailed May 26, 2011", 9 pgs.
"U.S. Appl. No. 11/915,718, Response filed Oct. 11, 2011 to Notice of Non-Compliant Amendment mailed Oct. 6, 2011", 4 pgs.
"U.S. Appl. No. 12/605,030, Final Office Action mailed May 21, 2012", 10 pgs.

(56) References Cited

OTHER PUBLICATIONS

"U.S. Appl. No. 12/605,030, Final Office Action mailed Jul. 16, 2014", 16 pgs.
"U.S. Appl. No. 12/605,030, Non Final Office Action mailed Oct. 7, 2011", 12 pgs.
"U.S. Appl. No. 12/605,030, Non Final Office Action mailed Nov. 7, 2013", 16 pgs.
"U.S. Appl. No. 12/605,030, Response filed Feb. 7, 2012 to Non Final Office Action mailed Oct. 7, 2011", 9 pgs.
"U.S. Appl. No. 12/605,030, Response Filed May 7, 2014 to Non Final Office Action mailed Nov. 7, 2013", 8 pgs.
"U.S. Appl. No. 12/605,030, Response filed Oct. 22, 2012 to Final Office Action mailed May 21, 2012", 8 pgs.
"U.S. Appl. No. 12/658,113, Non Final Office Action mailed Feb. 28, 2011", 26 pgs.
"U.S. Appl. No. 12/958,113, Examiner Interview Summary mailed Aug. 24, 2015", 2 pgs.
"U.S. Appl. No. 12/958,113, Final Office Action mailed Aug. 8, 2011", 26 pgs.
"U.S. Appl. No. 12/958,113, Final Office Action mailed Nov. 3, 2014", 25 pgs.
"U.S. Appl. No. 12/958,113, Non Final Office Action mailed Feb. 4, 2016", 25 pgs.
"U.S. Appl. No. 12/958,113, Non Final Office Action mailed Apr. 30, 2014", 21 pgs.
"U.S. Appl. No. 12/958,113, Non Final Office Action mailed Aug. 20, 2015", 25 pgs.
"U.S. Appl. No. 12/958,113, Notice of Allowance mailed Mar. 1, 2017", 14 pgs.
"U.S. Appl. No. 12/958,113, Response filed Feb. 3, 2015 to Final Office Action mailed Nov. 3, 2014", 11 pgs.
"U.S. Appl. No. 12/958,113, Response filed Feb. 8, 2012 to Final Office Action mailed Aug. 8, 2011", 12 pgs.
"U.S. Appl. No. 12/958,113, Response filed May 3, 2016 to Non Final Office Action mailed Feb. 4, 2016", 11 pgs.
"U.S. Appl. No. 12/958,113, Response filed May 20, 2011 to Non Final Office Action mailed Feb. 28, 2011", 13 pgs.
"U.S. Appl. No. 12/958,113, Response filed Jul. 16, 2014 to Non Final Office Action mailed Apr. 30, 2014", 12 pgs.
"U.S. Appl. No. 12/958,113, Response filed Nov. 6, 2015 to Non Final Office Action mailed Aug. 20, 2015", 12 pgs.
"U.S. Appl. No. 13/253,936, Appeal Brief filed Jan. 8, 2016", 10 pgs.
"U.S. Appl. No. 13/253,936, Appeal Brief filed Jun. 8, 2015", 13 pgs.
"U.S. Appl. No. 13/253,936, Final Office Action mailed Feb. 4, 2015", 14 pgs.
"U.S. Appl. No. 13/253,936, Final Office Action mailed Jun. 24, 2013", 13 pgs.
"U.S. Appl. No. 13/253,936, Non Final Office Action mailed Jun. 18, 2014", 14 pgs.
"U.S. Appl. No. 13/253,936, Non Final Office Action mailed Oct. 8, 2015", 15 pgs.
"U.S. Appl. No. 13/253,936, Non Final Office Action mailed Nov. 28, 2012", 11 pgs.
"U.S. Appl. No. 13/253,936, Reply Brief filed Aug. 23, 2016", 4 pgs.
"U.S. Appl. No. 13/253,936, Response filed Mar. 27, 2013 to Non Final Office Action mailed Nov. 28, 2012", 11 pgs.
"U.S. Appl. No. 13/253,936, Response filed Dec. 16, 2014 to Non Final Office Action mailed Jun. 18, 2014", 9 pgs.
"U.S. Appl. No. 13/253,936, Response filed Dec. 23, 2013 to Final Office Action mailed Jun. 24, 2013", 5 pgs.
"U.S. Appl. No. 13/253,941, Final Office Action mailed Jun. 6, 2013", 16 pgs.
"U.S. Appl. No. 13/253,941, Final Office Action mailed Dec. 26, 2014", 18 pgs.
"U.S. Appl. No. 13/253,941, Non Final Office Action mailed May 7, 2014", 18 pgs.
"U.S. Appl. No. 13/253,941, Non Final Office Action mailed Nov. 15, 2012", 14 pgs.
"U.S. Appl. No. 13/253,941, Response filed Apr. 15, 2013 to Non Final Office Action mailed Nov. 15, 2012", 13 pgs.
"U.S. Appl. No. 13/253,941, Response filed Nov. 6, 2013 to Final Office Action mailed Jun. 6, 2013", 11 pgs.
"U.S. Appl. No. 13/253,941, Response filed Nov. 7, 2014 to Non Final Office Action mailed May 7, 2014", 10 pgs.
"U.S. Appl. No. 13/365,062, Non Final Office Action mailed Mar. 19, 2015", 14 pgs.
"U.S. Appl. No. 13/365,062, Non Final Office Action mailed Apr. 30, 2014", 13 pgs.
"U.S. Appl. No. 13/365,062, Non Final Office Action mailed Aug. 19, 2013", 14 pgs.
"U.S. Appl. No. 13/365,062, Non Final Office Action mailed Oct. 9, 2014", 13 pgs.
"U.S. Appl. No. 13/365,062, Non Final Office Action mailed Nov. 30, 2012", 19 pgs.
"U.S. Appl. No. 13/365,062, Non-Final Office Action mailed Jul. 3, 2012", 20 pgs.
"U.S. Appl. No. 13/365,062, Notice of Allowance mailed Jul. 24, 2015", 11 pgs.
"U.S. Appl. No. 13/365,062, Response filed Feb. 9, 2015 to Non Final Office Action mailed Oct. 9, 2014", 6 pgs.
"U.S. Appl. No. 13/365,062, Response filed May 29, 2013 to Non Final Office Action mailed Nov. 30, 2012", 8 pgs.
"U.S. Appl. No. 13/365,062, Response filed Jun. 19, 2015 to Non Final Office Action mailed Mar. 19, 2015", 9 pgs.
"U.S. Appl. No. 13/365,062, Response filed Sep. 2, 2014 to Non Final Office Action mailed Jul. 30, 2014", 8 pgs.
"U.S. Appl. No. 13/365,062, Response filed Oct. 3, 2012 to Non Final Office Action mailed Jul. 3, 2012", 8 pgs.
"U.S. Appl. No. 13/365,062, Response filed Dec. 19, 2013 to Non Final Office Action mailed Aug. 19, 2013", 10 pgs.
"U.S. Appl. No. 13/464,598, Appeal Brief filed Jan. 28, 2016", 19 pgs.
"U.S. Appl. No. 13/464,598, Examiner Interview Summary mailed May 1, 2014", 3 pgs.
"U.S. Appl. No. 13/464,598, Final Office Action mailed Jul. 28, 2015", 38 pgs.
"U.S. Appl. No. 13/464,598, Non Final Office Action mailed Mar. 16, 2015", 51 pgs.
"U.S. Appl. No. 13/464,598, Non Final Office Action mailed Dec. 4, 2013", 26 pgs.
"U.S. Appl. No. 13/464,598, Response filed Apr. 5, 2014 to Non Final Office Action mailed Dec. 4, 2013", 44 pgs.
"U.S. Appl. No. 13/464,598, Response filed Jul. 16, 2015 to Non Final Office Action mailed Mar. 16, 2015", 24 pgs.
"U.S. Appl. No. 13/573,803, Final Office Action mailed Apr. 7, 2015", 16 pgs.
"U.S. Appl. No. 13/573,803, Non Final Office Action mailed Sep. 15, 2014", 15 pgs.
"U.S. Appl. No. 13/573,803, Non Final Office Action mailed Dec. 5, 2013", 16 pgs.
"U.S. Appl. No. 13/573,803, Response filed Jun. 5, 2014 to Non Final Office Action mailed Dec. 5, 2013", 12 pgs.
"U.S. Appl. No. 13/573,803, Response filed Dec. 15, 2014 to Non Final Office Action mailed Sep. 15, 2014", 12 pgs.
"U.S. Appl. No. 13/573,804, Final Office Action mailed Mar. 23, 2015", 16 pgs.
"U.S. Appl. No. 13/573,804, Non Final Office Action mailed Oct. 20, 2014", 15 pgs.
"U.S. Appl. No. 13/573,804, Response filed Jan. 20, 2015 to Non Final Office Action mailed Oct. 20, 2014", 15 pgs.
"U.S. Appl. No. 13/573,804, Response filed Aug. 29, 2014 to Restriction Requirement mailed Jun. 30, 2014", 8 pgs.
"U.S. Appl. No. 13/573,804, Restriction Requirement mailed Jun. 30, 2014", 5 pgs.
"U.S. Appl. No. 14/010,376, Final Office Action mailed Aug. 19, 2015", 13 pgs.
"U.S. Appl. No. 14/010,376, Non Final Office Action mailed Mar. 24, 2015", 10 pgs.

(56) References Cited

OTHER PUBLICATIONS

"U.S. Appl. No. 14/010,376, Response filed Jun. 24, 2015 to Non Final Office Action mailed Mar. 24, 2015", 10 pgs.
"U.S. Appl. No. 14/010,380, Final Office Action mailed Oct. 6, 2015", 11 pgs.
"U.S. Appl. No. 14/010,380, Non Final Office Action mailed Apr. 15, 2015", 11 pgs.
"U.S. Appl. No. 14/010,380, Response filed Aug. 17, 2015 to Non Final Office Action mailed Apr. 15, 2015", 11 pgs.
"U.S. Appl. No. 14/010,391, Final Office Action mailed Sep. 15, 2015", 11 pgs.
"U.S. Appl. No. 14/010,391, Non Final Office Action mailed Mar. 23, 2015", 11 pgs.
"U.S. Appl. No. 14/010,391, Response filed Jul. 22, 2015 to Non Final Office Action mailed Mar. 23, 2015", 10 pgs.
"U.S. Appl. No. 14/010,400, Final Office Action mailed Sep. 10, 2015", 9 pgs.
"U.S. Appl. No. 14/010,400, Non Final Office Action mailed Apr. 22, 2015", 11 pgs.
"U.S. Appl. No. 14/010,400, Response filed Jul. 22, 2015 to Non Final Office Action mailed Apr. 22, 2015", 10 pgs.
"U.S. Appl. No. 14/483,903, Non Final Office Action mailed Sep. 1, 2015", 10 pgs.
"U.S. Appl. No. 14/536,320, Non Final Office Action mailed Mar. 25, 2015", 9 pgs.
"U.S. Appl. No. 14/750,559, Preliminary Amendment filed Jun. 26, 2015 t", 9 pgs.
"U.S. Appl. No. 14/949,549, Notice of Allowance mailed Jan. 18, 2017", 11 pgs.
"U.S. Appl. No. 14/949,549, Response filed Jul. 20, 2016 to Non Final Office Action mailed Apr. 20, 2016", 8 pgs.
"U.S. Appl. No. 14/949,549, Response filed Aug. 26, 2016 to Non Final Office Action mailed Apr. 20, 2016", 8 pgs.
"U.S. Appl. No. 14/949,549, Response filed Dec. 27, 2016 to Final Office Action mailed Oct. 27, 2016", 7 pgs.
"U.S. Appl. No. 15/610,332, Final Office Action mailed Dec. 20, 2019", 15 pgs.
"U.S. Appl. No. 15/610,332, Non Final Office Action mailed Jun. 2, 2020", 18 pgs.
"U.S. Appl. No. 15/610,332, Non Final Office Action mailed Jul. 11, 2019", 19 pgs.
"U.S. Appl. No. 15/610,332, Notice of Allowance mailed Apr. 2, 2021", 9 pgs.
"U.S. Appl. No. 15/610,332, Response filed Mar. 19, 2020 to Final Office Action mailed Dec. 20, 2019", 10 pgs.
"U.S. Appl. No. 15/610,332, Response filed Oct. 2, 2020 to Non Final Office Action mailed Jun. 2, 2020", 11 pgs.
"U.S. Appl. No. 15/610,332, Response filed Oct. 11, 2019 to Non-Final Office Action mailed Jul. 11, 2019", 11 pgs.
"U.S. Appl. No. 17/364,554, Examiner Interview Summary mailed Apr. 10, 2023", 2 pgs.
"U.S. Appl. No. 17/364,554, Final Office Action mailed Feb. 24, 2023", 14 pgs.
"U.S. Appl. No. 17/364,554, Non Final Office Action mailed Jul. 21, 2022", 17 pgs.
"U.S. Appl. No. 17/364,554, Notice of Allowance mailed May 24, 2023", 9 pgs.
"U.S. Appl. No. 17/364,554, Preliminary Amendment filed Sep. 22, 2021", 8 pages.
"U.S. Appl. No. 17/364,554, Response filed Apr. 24, 2023 to Final Office Action mailed Feb. 24, 2023", 9 pgs.
"U.S. Appl. No. 17/364,554, Response filed Nov. 21, 2022 to Non Final Office Action mailed Jul. 21, 2022", 12 pgs.
"U.S. Appl. No. 14/949,549, Final Office Action mailed Oct. 27, 2016", 14 pgs.
"U.S. Appl. No. 14/949,549, Non Final Office Action mailed Apr. 20, 2016", 14 pgs.
"Australian Application Serial No. 2006272510, Office Action mailed Oct. 22, 2010", 3 pgs.

"Australian Application Serial No. 2006272510, Response filed Oct. 6, 2011 to Office Action mailed Oct. 22, 2011", 15 pgs.
"Australian Application Serial No. 2012200701, Office Action mailed Aug. 21, 2013", 2 pgs.
"Australian Application Serial No. 2012200701, Response filed Dec. 12, 2013 to Office Action mailed Aug. 21, 2013", 33 pgs.
"Australian Application Serial No. 2013270518, Response filed May 25, 2016 to Subsequent Examiners Report mailed Feb. 1, 2016", 13 pgs.
"Australian Application Serial No. 2013270518, Subsequent Examiners Report mailed Feb. 1, 2016", 2 pgs.
"Australian Application Serial No. 2013270518, Subsequent Examiners Report mailed Jun. 7, 2016", 2 pgs.
"Casefinder Manual, Ch. 1: Overview; Ch. 8: Hyperlinking", [Online]. Retrieved from the Internet: < URL: http://web.archive.org/web/20040419155315/http://www.casefinder.com/downloads/manual-5.00.pdf>, (Archived Apr. 19, 2004), 13 pgs.
"East Text Search Training", (Jan. 2000), 155 pgs.
"European Application Serial No. 05775617.3, Extended European Search Report mailed Mar. 24, 2009", 8 pgs.
"European Application Serial No. 06800464.7, Amendment filed Mar. 21, 2011", 7 pgs.
"European Application Serial No. 06800464.7, Examination Notification Art. 94(3) mailed May 2, 2014", 8 pgs.
"European Application Serial No. 06800464.7, Extended European Search Report mailed Aug. 24, 2010", 8 pgs.
"European Application Serial No. 06800464.7, Response filed Sep. 11, 2014 to Office Action mailed May 2, 2014", 16 pgs.
"European Application Serial No. 06800464.7, Summons to Attend Oral Proceedings mailed Oct. 10, 2017", 10 pgs.
"International Application Serial No. PCT/US2005/026768, Demand mailed Mar. 7, 2007", 9 pgs.
"International Application Serial No. PCT/US2005/026768, International Preliminary Report on Patentability mailed Mar. 29, 2007", 8 pgs.
"International Application Serial No. PCT/US2005/026768, International Search Report mailed Mar. 7, 2007", 5 pgs.
"International Application Serial No. PCT/US2005/026768, Written Opinion mailed Mar. 7, 2007", 5 pgs.
"International Application Serial No. PCT/US2006/020950, International Preliminary Report on Patentability mailed Dec. 13, 2007", 6 pgs.
"International Application Serial No. PCT/US2006/020950, International Search Report mailed Feb. 5, 2007", 2 pgs.
"International Application Serial No. PCT/US2006/020950, Written Opinion mailed Feb. 5, 2007", 4 pgs.
"International Application Serial No. PCT/US2006/029456, International Preliminary Report on Patentability mailed Feb. 7, 2008", 9 pgs.
"International Application Serial No. PCT/US2006/029456, International Search Report mailed Oct. 1, 2007", 5 pgs.
"International Application Serial No. PCT/US2006/029456, Written Opinion mailed Oct. 1, 2007", 7 pgs.
"International Search Report and Written Opinion in PCT/US05/26768, mailed Mar. 7, 2007", 15 pgs.
"Notice from the European Patent Office dated Oct. 1, 2007 concerning business methods", Official Journal of the European Patent Office, 30(11), (Nov. 1, 2007), 592-593.
"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.
"Using Citation Link", Delphion, [Online]. Retrieved from the Internet: <URL: http://web.archive.org/web/20041204224023/www.delphion.com/help/citelink_help>, (Archived Dec. 4, 2004), 10 pgs.
"What is Pair?", USPTO, [Online]. Retrieved from the Internet: <URL: http://web.archive.org/web/20040606224528/pair.uspto.gov/cgi-bin/final/help.pl>, (Archived Jun. 6, 2004), 9 pgs.
Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.

(56) References Cited

OTHER PUBLICATIONS

Chang, Muchiu, "Sun Tzu and sustainable competitive advantage", IEEE Int'l Engineering Management Conference, vol. 1, (Oct. 18-21, 2004), 153 -157.

Davis, Lee, "The Strategic Use of Patents in International Business", The 28th Annual EIBA Conference, Athens, Greece, (Dec. 2002), 27 pgs.

East, T. W, "Patent Claims—How to Keep Track of Them", IEEE Aerospace and Electronic Systems Magazine, 10(8), (Aug. 1995), 32-33.

Fall, C.J., et al., "Literature Survey: Issue to be considered in the automatic classifications of patents", World Intellectual Property Organization, (Oct. 2002), 64 pgs.

Gruber, T R, et al., "A Translation Approach to Portable Ontology Specifications", KSL Report KSL-92-71, Knowledge Systems Laboratory, Stanford University, (1993), 24 pgs.

Hoover, A. E, "Electronic Filing Top 10 Wish List", IP Today, (Jul. 2006), 2 pgs.

Hutzell, Paula, "Image File Wrapper (IFW) Processing", USPTO PPT Presentation, (May 8, 2003), 25 pgs.

Indukuri, Kishore Varma, et al., "Similarity Analysis of Patent Claims Using Natural Language Processing Techniques", International Conference on Computational Intelligence and Multimedia Applications, (2007), 169-175.

Langan-Fox, Janice, "Team Mental Models: Techniques, Methods, and Analytic Approaches", The Journal of the Human Factors and Ergonomics Society, vol. 42, No. 2, (2000), 30 pgs.

Larkey, L. S, "A Patent Search and Classification System", Proc. of the 4th ACM Conference of Digital Libraries, (1999), 179-187.

Larkey, Leah S, et al., "Collection Selection and Results Merging with Topically Organized U.S. Patents and TREC Data", Proc. of the 9th Int'l Conference on Information and Knowledge Management, (2000), 8 pgs.

Luo, Si, et al., "A Semisupervised Learning Method to Merge Search Engine results", ACM Transactions on Information Systems, vol. 21, No. 4, (Oct. 2002), 35 pgs.

Madrid, Juan M, et al., "Incorporating Conceptual Matching in Search", Proc. of the 11th Conference on Information and Knowledge Management, (2002), 17 pgs.

Mahesh, K., "Ontology Development for Machine Translation: Ideology and Methodology", Technical Report MCCS-96-292, Computing Research Laboratory, New Mexico State University, (1996), 87 pgs.

Mase, H., et al., "Proposal of Two-Stage Patent Retrieval Method Considering the Claim Structure", ACM Transactions on Asian Language Information Processing (TALIP), 4(2), (Jun. 2005), 190-206.

Quinn, B., "Internet Access to Patent Application Files Now Available", Press Release, [Online]. Retrieved from the Internet: <URL: http://web.archive.org/web/20040813210925/http://www.uspto.gov/web/offices/com/speeches/04-13.htm>, (Aug. 2, 2004), 1 pg.

Sheremetyeva, S., et al., "Generating Patent Claims from Interactive Input", Proc. of the 8th International Workshop on Natural Language Generation (INLG), (Jun. 1996), 61-70.

Sheremetyeva, S., et al., "Knowledge Elicitation for Authoring Patent Claims", IEEE Computer, 29(7), (Jul. 1996), 57-63.

Sheremetyeva, S., "Natural Language Analysis of Patent Claims", Proc. of the ACL-2003 Workshop on Patent Corpus Processing, (2003), 66-73.

Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.

Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.

Woods, W. A, "Conceptual Indexing: A Better Way to Organize Knowledge", Sun Microsystems, Inc., (1997), 99 pgs.

U.S. Appl. No. 10/915,265, filed Aug. 10, 2004, Patent Mapping.
U.S. Appl. No. 12/958,113 U.S. Pat. No. 9,697,577, filed Dec. 1, 2010, Patent Mapping.
U.S. Appl. No. 15/610,332 U.S. Pat. No. 11,080,807, filed May 31, 2017, Patent Mapping.
U.S. Appl. No. 17/364,554 U.S. Pat. No. 11,776,084, filed Jun. 30, 2021, Patent Mapping.
U.S. Appl. No. 11/494,278 U.S. Pat. No. 8,161,025, filed Jul. 27, 2006, Patent Mapping.
U.S. Appl. No. 13/365,062 U.S. Pat. No. 9,201,956, filed Feb. 2, 2012, Patent Mapping.
U.S. Appl. No. 14/949,549 U.S. Pat. No. 9,659,071, filed Nov. 23, 2015, Patent Mapping.

* cited by examiner

PATENT MAPPING

RELATED APPLICATIONS

This application is a continuation of U.S. application Ser. No. 17/364,554, filed Jun. 30, 2021, which is a continuation of U.S. application Ser. No. 15/610,332, filed May 31, 2017, now U.S. Pat. No. 11,080,807, issued on May 31, 2017, which is a continuation of U.S. application Ser. No. 12/958,113, filed Dec. 1, 2010, now U.S. Pat. No. 9,697,577, issued on Jul. 4, 2017, which is a divisional of U.S. application Ser. No. 10/915,265, filed Aug. 10, 2004, each of which are incorporated herein by reference in its entirety and to each of which priority is claimed.

TECHNICAL HELD

The inventive subject matter relates to patent mapping and more particularly to systems, software, methods and data structures for patent mapping.

BACKGROUND ART

Tools for identifying patents for a particular purpose such as a prior art search, validity analysis, or a freedom to operate investigation, operate by performing Boolean queries using various search operators. These operators allow for searching by date, terms, document number, and patent classification, among others. These tools further allow for searching individual document portions such as a document title, abstract, or claim set.

Other searching tools accept freeform text. Such tools accept a freeform text block and extract information from the text block deemed most likely to return acceptable results. However, such tools are still limited to only performing Boolean queries and displaying a list of results.

These search tools often provide large numbers of results, most of which are irrelevant. These tools fail to present results in a manner allowing for quick relevancy determinations. The presentation also fails to provide enough detail suggesting how to adjust a search for obtaining only relevant results. Further, the search tools provide the documents of the result set in a manner very similar to the traditional paper format of the documents.

DISCLOSURE

Figure 1:
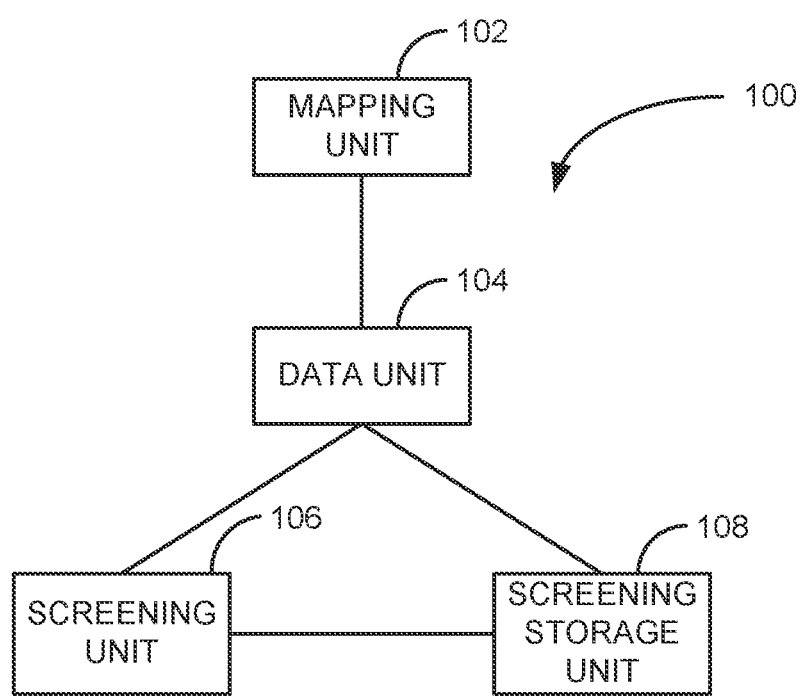
FIG. 1 is a functional block diagram of one example embodiment.

The inventive subject matter provides systems, software, methods, and data structures for patent mapping, searching, and display to quicken analysis of patent documents for virtually any purpose. Various example embodiments of the inventive subject matter assist practitioners in producing higher quality work product by reducing irrelevant search results, leaving more time and money to focus on the more important analysis. Some further embodiments assist in analysis by interweaving patent documents and linking various portions of individual patent documents with other portions of the same document. Yet further embodiments assist in analyzing patent documents by identifying similarities and differences between one or more patent documents or portions thereof.

In the following detailed description, reference is made to the accompanying drawings that form a part hereof, and in which are shown by way of illustration specific embodiments in which the inventive subject matter can be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The inventive subject matter herein, in one example embodiment is useful to conduct a patent clearance study to clear a large number of components and assemblies of interest. Such a large scale clearance project presents a number of challenges and opportunities.

When performing such a study of a large number of patent documents, such as United States and foreign patents and patent applications, the same patent documents need to be screened many times against a wide range of assemblies and components. This can lead to considerable wasted effort unless a well structured approach is taken. Further, the sheer volume of the work creates a special incentive to devise a triage system of review, wherein as much of the work as possible can be done by the least expensive resources. Efficient methodologies of review can be implemented using the inventive subject matter to not only produce relevant results, but also to control cost.

Projects, such as patent clearance studies, often do not capture knowledge that can be re-used as a resource at a later point in time either within the parameters of the clearance study or for other purposes. The inventive subject matter provides a process and system that retains at least some of the knowledge gained through the study, in an accessible manner.

In the present example embodiment, a pool of patent documents to be mapped and screened is identified using various techniques. Some such techniques include identifying patent documents by assignee, patent class, keyword searches, inventor information such as name or city and state of residence, title, or other information within patent documents or other source of data related to patent documents. New patent documents can be added or subtracted from this pool while mapping is in progress, or at a later date when the patent pool or clearance study is updated.

In some embodiments, depending on the requirements of a patent clearance study, at least the independent claims of each patent document within the identified patent pool will be mapped using a computer system and software operating on the system. In some embodiments, the mapping includes assigning a reusable concept to a patent claim as a whole, termed the "claim concept," the claim concept being broad enough to encompass the broadest possible reading of the claim. For example, if the claim is directed to a dog with a red tail, the claim concept may be "dog," or a mapper may assign it to the claim concept "animal," depending on preferences, experience, breadth of the clearance study, or requirements. Further concepts may be mapped to claim elements or limitations. These concepts are termed "limitation concepts," and, in essence, define limits on the scope of the claim concept(s) assigned to a claim as a whole. For example, the limitation concept "red tail" may be mapped to the example claim. Or, the claim directed to a dog with a red tail may be mapped to both claim concepts "dog" and "animal," and a further concept tail.

Further, claim concepts, or limitation concepts, may be arranged or structured in a hierarchical fashion, with multiple levels. For instance, the claim concept "dog" may be structured as a sub-concept of "animal." "Red tail" may be structured as a sub-concept of "tail."

In some embodiments, after the claim is mapped to one or more claim concepts, the limiting elements are mapped. These limitations are found in the preamble and/or body of claim. First, limitations of interest in the claim are identified. In some embodiments, not all limitations need be mapped. Limitations of interest may be highlighted, or otherwise selected or annotated. The highlighted limitations are then mapped, or associated, with one or more reusable limitation concepts kept in a concept catalog or index or other data structure. The catalog may also contain reusable claim concepts. If the catalog does not contain a suitable limitation concept to map to, a new limitation concept is added to the catalog "on the fly" or at a later time. Periodically the catalog is reviewed and similar claim or limitation concepts are merged together when possible to limit the size of the concept catalog. In some embodiments, a patent claim with one or two particularly narrow limitations may only require mapping of the one or two limitations to corresponding limitation concepts, in order to capture the most salient information concerning the claim's scope.

Within any given patent document there are often many claims with similar limitations. Once a claim is mapped in a given patent, the mapping software may analyze each successive claim chosen for mapping and suggest mappings based on the way the previous claim(s) in the patent document have been mapped. Automated suggestions may also be made using mappings established for claims in other patent documents. Using this tool, mapping is both greatly accelerated and also made more uniform.

In some embodiments, a screening tool is used to rule out patent documents that are not of interest to a target subject matter. A target subject matter to be screened, in various embodiments, includes any patentable subject matter, such as a method, apparatus, or composition of matter, whether actual or hypothetical. In some embodiments, the process of using the screening tool includes opening a screening activity data structure and identifying a target subject matter to be screened, for example, by typing in a description of the subject matter into a field or alternatively picking it from a preexisting list. A pool of patent documents to screen is also assembled or identified. Patent documents to be screened may be added to the pool based on such search criteria as one or more of assignee, patent classification, keyword, inventor or other data identifiable in a patent document, or by any other selection criteria. All these methods or others may be used to identify a pool of patent documents to screen the target subject matter against. Alternatively, in addition, one or more claim concepts in the catalog may be identified, such that the identified claim concepts are broad enough to cover the target subject matter. The one or more claim concepts may be used to create a pool of limitation concepts to be screened, wherein the claims mapped to these concepts are added to the pool. If claims are identified for screening based on a claim concept, then the parent patent document containing the identified claims may also be added to the pool. Alternatively, the pool may be formed only of claims to be screened and not necessarily every claim of any patent that has a claim in the pool.

The following embodiment assumes that a pool of patent documents is initially assembled for screening and in turn the pool of claims to be screened belong to these patent documents. The claim concepts or limitation concepts associated with the identified pool of patents (and associated claims to which the concepts are mapped) to be screened are assembled into a concept pool for use in screening the patent documents in view of the target subject matter. A screener then reviews the concepts in the concept pool, ruling out any concepts that are not found in the target subject matter. Concepts may be marked as "definitely not in target subject matter", "maybe in target subject matter", or "don't know." If a concept is marked "definitely not found in target subject matter", then any claim mapped to that concept may be ruled out. If desired, in a software implementation, the inventive subject matter may require multiple concepts to be ruled "definitely not found" for any given claim to be ruled out.

In order to speed screening, the concepts in the pool being mapped may be reduced as follows. Once a concept is marked "definitely not in target subject matter", the screening software rules out all claims that are mapped to the eliminated concept. Any concepts that are solely mapped to the ruled out claims may then be marked "removed from consideration." Some embodiments also include annotating ruled out claims or concepts as to why the claims or concepts ruled out were removed (e.g., which claim was ruled out to eliminate them). This annotating is in a data structure related to the concept as it applies to the particular target subject matter being analyzed. Using this process, the pool of concepts to be reviewed is reduced both by the action of ruling out concepts and by the corresponding elimination of concepts removed from consideration. In one embodiment, claim concepts may be the first concepts screened, allowing for a "high level" elimination of claims. For example, if the claim concept "dog" is ruled out, then all claims mapped to this claim concept may be ruled out. In turn, all limitation concepts mapped solely to ruled out claims are also eliminated from consideration.

In some embodiments, once all concepts in the concept pool are reviewed, there are assorted outputs that are preferably kept in a data structure. The first output includes a record of the screening. The record of the screening includes marking each concept with a status, such as: "definitely not in target subject matter", "maybe in target subject matter", "don't know", or "removed from consideration." This record can be revisited, reviewed, or edited. The second output includes a list of claims that are not applicable to the target subject matter. For example, any claim ruled out is added to the list of claims that are not applicable to the subject of the target subject matter. This list flows from the status of each concept and in turn the claims the concept belongs to. The third output includes a list of patent documents that are not applicable to the target subject matter. Any patent document with all claims ruled out is added to this list of non-applicable patent documents. This list flows from the status of each claim within a parent patent. The third output includes a list of all claims that are not definitively ruled out in the screening process. The fourth output is a list of patent documents or claims not ruled out. This is a list of all patent documents that are not definitively ruled out in the screening process. There may also be a list of claims removed from consideration. These outputs may be presented as paper reports or as on-line reports or displays which allow a user to drill through the eliminated concepts, claims or patent documents, or to view the supporting patent specification or portions thereof for a ruled out or ruled in patent document.

Another output is specific to a patent or a family or other groups of patents. This output may be an index to the mapped claims in the patent or group. For instance, the index may list all mapped claim concepts and/or limitation concepts with applicable claim numbers indicated for each concept. Concepts appearing in all claims may be highlighted. Another output may be a hierarchy chart or diagram showing concept/sub-concept relationships. These outputs may be paper or online with interactive hyper-links to claims.

In some embodiments, mapping of patent documents and claims is semi-automated. In addition, mapping personnel can be trained to identify esoteric or narrow limitations in claims and map only those limitations. This reduces mapping time for inherently narrow patent claims. To screen out possibly applicable patent documents, the process only requires that limitations be mapped to a concept that is at least as broad as the limitation. It is not problematic that the mapping is to an overbroad concept because the screening process is intended only to eliminate patents or claims from consideration and not to positively identify patents that are infringed. Thus, these types of "false positives" are not a problem when using the tool, as the false positives can be ruled out by further review or study.

Screening can also be accomplished in reverse. That is, concepts applicable to the target subject matter can be identified as "present" or "maybe present." This process will identify potential claims that cover the target subject matter. However, this process would ideally require that all limitations in a claim be mapped accurately to concepts so as to not include a multitude of false positives or possibly false negatives.

In some embodiments, software and systems, according to the inventive subject matter herein, is web-based and accessible with a user name and password. Subscribers to such systems and software may receive a license to use the software for an individual project, a period of time, or on a pay-per-access or pay-per-unit of time basis.

FIG. 1 shows a functional block diagram of one example embodiment of the inventive subject matter. This example embodiment illustrates software 100 for mapping and searching for patent documents. In some embodiments, the patent documents include one or both of patents and published patent applications. In some embodiments, the patent documents include United States patent documents, while other embodiments include international patent documents. The software 100 for mapping these patent documents includes a mapping unit 102, a data unit 104, a searching unit 106, and a search storage unit 108.

In some embodiments of the software 100, the mapping unit 104, the searching unit 106, and the search storage unit 108 work with associations of data between various portions of patent documents. Some such associations include two limitation concepts associated with a concept that defines a relationship between limitation concepts, termed "relational concept." An example of such an association is, "A dog wags its tail." The two limitation concepts are "dog" and "tail." The relational concept is "wags." Some patent claims may contain many of such associations. For example, "A dog wags its tail that is brown." The first association is the same as before. The second association is between limitation concepts "tail" and "brown." The second relational concept is "is." "Is" in this context equates to "has color."

In one embodiment, any type of concept may have an associated definition. For instance, dog may be defined as a "canine species having four legs." As mentioned above, some claim concepts may be designated subordinate to other claim concepts, such as a processor concept that is subordinated to the concept of computers. In addition, a limitation concept may be designated as a subordinate concept to a claim concept or another limitation concept, for example, in a hierarchy. In some such embodiments, a subordinate concept can be designated as an inherent property of a concept. For instance, the limitation concept "head" may be designated an inherent property of "dog." In other embodiments, a concept definition includes various properties of the concept that are inherent, such as a personal computer concept having an inherent property of a housing encasing a number of components. Other embodiments include concepts that are descriptive or actions such as "storing data" or "electronic funds transfer." The "storing data" example might include a definition that encompasses databases, storage devices, or storage media. The "electronic funds transfer" might encompass banking, money, network, transfer, Federal Reserve, or EFS. Some embodiments of concept definitions include a glossary of words useful in identifying the concept.

In some embodiments, the mapping unit 102 operates to paraphrase one or more portions of patent claim elements or limitations, and map the paraphrase to a concept. In some embodiments, the paraphrased portion is a general idea derived from a claim that is implicit to the claim, but not explicitly stated in the claim. This paraphrasing in various embodiments includes mapping one or more concepts to a claim. In some such embodiments, a limitation concept is mapped to one or more claim limitations or elements. The mapping unit 102 then stores mapped patent documents and/or claims in the data unit 104. In some embodiments, a mapping utility is included in the mapping unit 102. This mapping utility extracts language from an unmapped patent claim and compares the extracted language against concept definitions and previously mapped patent claims to determine a likely mapping. In some such embodiments, the mapping utility makes a mapping recommendation through a user interface. In other embodiments, the utility operates in a batch mode and automatically maps patent claims.

In some embodiments, the data unit 104 operates to store output from the mapping unit 102 and provide data to the searching screening unit 106. The data unit 104 also stores data received from the search storage unit 108 and serves data to the search storage unit 108 when requested. In one such embodiment, the data unit 104 includes a database management system (DBMS) for storing and retrieving data. In some embodiments, the DBMS is a relational database management system (RDBMS). In some other embodiments, the data unit 104 includes storing data in a Resource Description Framework Schema (RDFS). In some embodiments, the various units communicate with the data unit 104 using a language such as Structured Query Language (SQL) or eXtensible Markup Language (XML).

The searching unit 106 includes tools for extracting patent data in a useful manner from the data unit 104. In some embodiments, the starting point for searching is the entire universe of patent documents in the data unit 104. Documents in this universe, or pool, are eliminated based on input by a searcher. In some embodiments, this input includes eliminating concepts from consideration. In some embodiments, when concepts are eliminated, patent claims or documents containing solely eliminated concepts are removed from the universe.

The storage unit 108 performs functions for storing and retrieving search results obtained by the screening unit 106 in the data unit 104. In some embodiments, storing the search results includes storing various parameters used in search including eliminated concepts, or even a list of specific documents excluded from a search. In other embodiments, a listing of identified patent documents is stored. Some such embodiments also store search parameters such as eliminated concepts.

Figure 2:
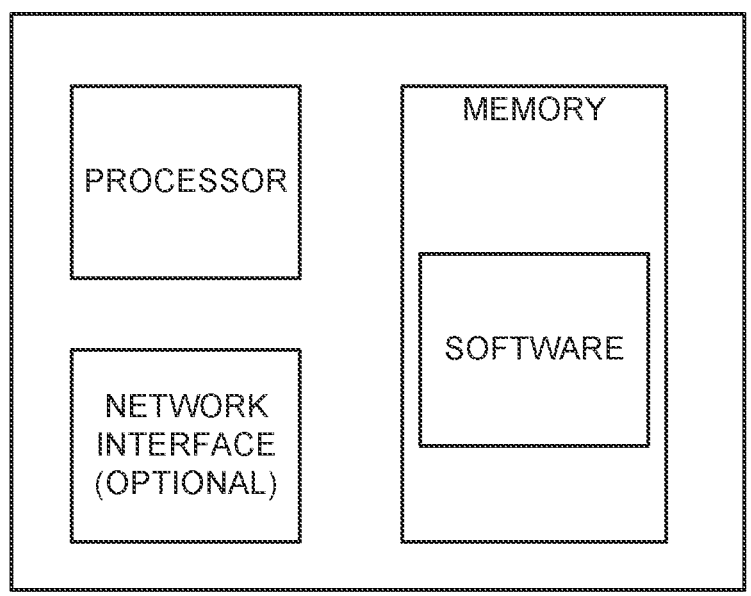
FIG. 2 is a system schematic diagram of one example embodiment.

FIG. 2 shows a schematic diagram of a system 200 according to one example embodiment of the inventive subject matter. The system 200 includes a processor 202 and a memory 204 holding the software 100 (as shown in FIG. 1). Some embodiments of the system 200 include an optional network interface 206 for accessing a network during execution of the software 100. In some such networked embodiments, the system is a client/server system where various portions of the software 100 are distributed across a network for performing various tasks required by the software. In some other networked embodiments, the system is a web-based system with software distributed across a network, such as a local or wide area network, an intranet, or the Internet, with various portions of the software distributed across the network. In some such web-based systems, a client computer causes the software 100 to execute through interaction with the software 100 through a client user process such as a web browser.

In some embodiments, the processor 202 represents a central processing unit (CPU) of any type of architecture, such as a CISC (Complex Instruction Set Computing), RISC (Reduced Instruction Set Computing), VLIW (Very Long Instruction Word), or hybrid architecture, although any appropriate processor may be used. The processor 202 executes instructions, such as instructions contained within the software 100. In some other embodiments, the processor is a graphics processor on a video card. The processor 202 in these embodiments also includes a control unit that organizes data and program storage in memory 204 and transfers data and other information in and out of the system 200 and to and from a network over the network interface 206 and other devices attached to the network. Although the system 200 is shown to contain only a single processor 202, the present inventive subject matter applies equally to systems 200 that include multiple processors 202 such as multiple CPUs, multiple graphics processors, and combinations of CPU and graphics processors.

The memory 204 of the system 200 holds the software 100 as illustrated in FIG. 1. The memory 204 represents one or more mechanisms for storing data. For example, the memory 204, in various embodiments, includes read only memory (ROM), random access memory (RAM), magnetic disk storage media, optical storage media, flash memory devices, and/or other volatile and non-volatile machine-readable media. In other embodiments, any appropriate type of storage device or memory 204 can be used. Although only one memory 204 is shown, multiple memories 204 and multiple types of storage devices can be present. In various embodiments, some or all of the software 100, or other items, can be stored on the same or on different memory 204 or storage devices. Furthermore, although the system 200 is drawn to contain the memory 204, the memory 204 or other storage device can be distributed across other systems 200 or computing devices operatively coupled to the system 200 over the network interface 206 such as by a network or other wired or wireless communication link such as a network.

Figure 3:
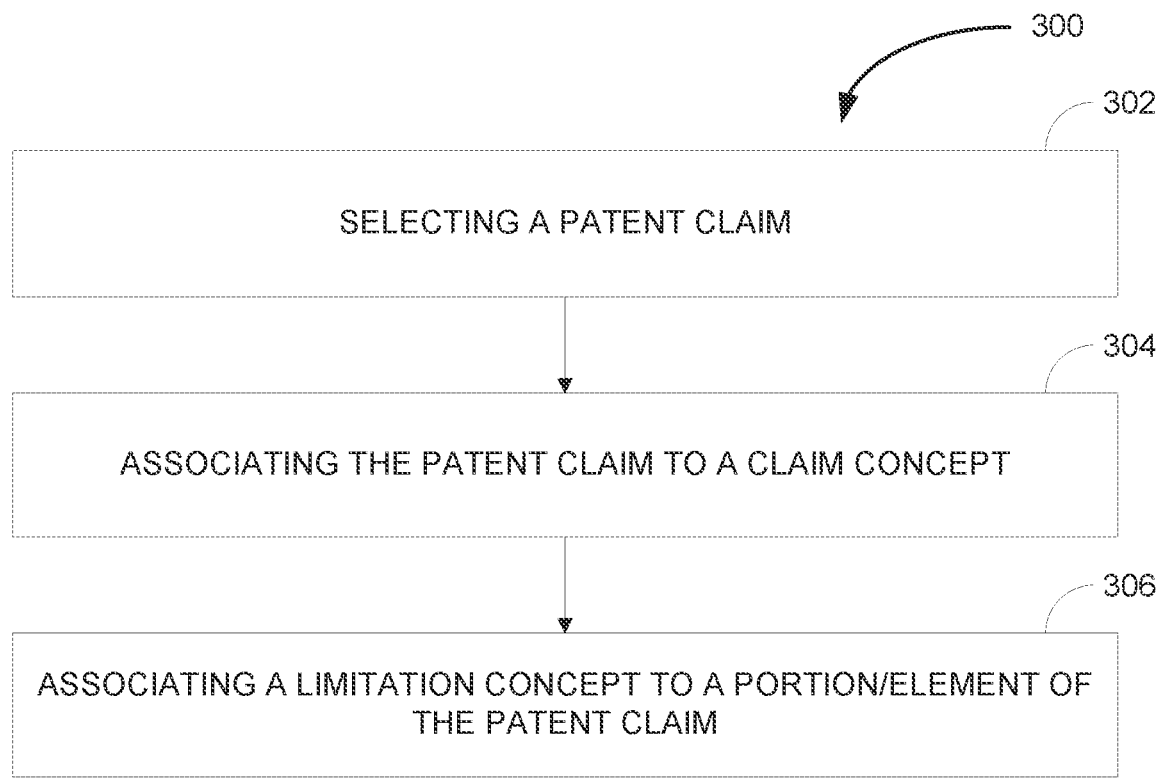
FIG. 3 is a method flow diagram of one example embodiment.

FIG. 3 is a method 300 flow diagram of one example embodiment. The method 300 of this embodiment includes selecting a patent claim 302, associating the patent claim to a claim concept 304, and associating the elements of the claim to one or more limitation concepts 306. Selecting a patent claim 302 includes selecting a claim from a patent document for mapping.

Associating the patent claim to a claim concept 304 includes assigning a concept designation to the claim as a whole. In other words, the claim concept will ideally have a scope that is at least as broad or broader than the scope of subject matter covered by the claim. Some embodiments provide the ability to assign multiple claim concepts to a claim. Associating a limitation concept to a portion or element of the patent claim 306 includes assigning the limitation concept to a portion of the claim such as a single limitation, a phrase, an element, an individual word within the claim or a paraphrasing of the scope of one or more these portions. For example, consider a claim including the limitation, "a dog having a tail." The claim as a whole could be assigned to a claim concept "mammal" or "canine." The word "tail" could be assigned to a limitation concept "body part" or "appendage" or simply "tail." It is not necessary, in alternate embodiments, that both claim concepts and limitation concepts be mapped. One or the other could suffice to permit screening. As a further example, the claim as a whole could be assigned to a claim concept "dog," wherein a definition of the concept dog includes a tail.

The results of the associating 304 and 306 are stored to provide search users of a system, such as system 200 of FIG. 2, the ability to not only search for patent claims by concept, but also to screen patent claims by concept. Some such embodiments provide searchers the ability to pin point specific claims and claim language of interest or concern when performing a screen as part of a freedom to operate opinion.

Some further embodiments of the method 300 include associating a portion of the patent document, such as a portion of a description section, to a claim. Such an assigned portion, in some embodiments, is a portion of the description providing support for the patent claim, or element thereof. Some embodiments include associating one or more sentences of a description section to an individual claim element. This association information is stored to allow mappers or screeners quick reference to support and explanation of the various patent claims and claim elements in the patent documents when mapping or screening.

Figure 4:
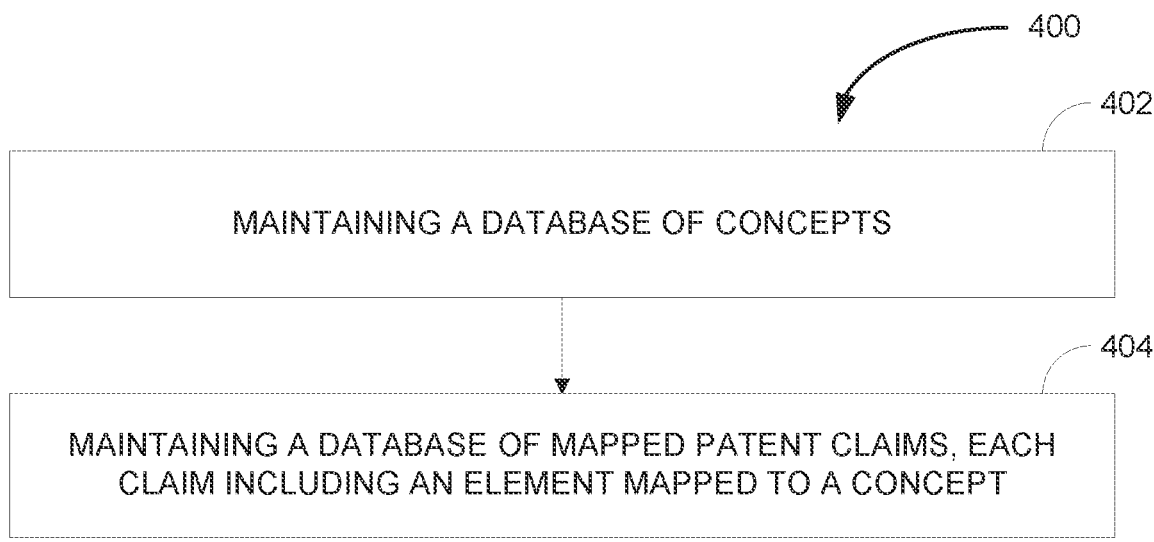
FIG. 4 is a method flow diagram of one example embodiment.

FIG. 4 is a method 400 flow diagram of one example embodiment. The method of this embodiment includes maintaining a database of concepts 402. The method 400 further includes maintaining a database of mapped patent claims, each claim including at least mapping to a concept 404. In other embodiments, a claim may only be assigned to a single claim concept and no elements or limitations in the claim are mapped. Or, a claim element may be mapped to a single limitation concept, and the claim as a whole not being mapped to a claim concept. Some such embodiments may further provide that the mapped elements being non-inherent elements of the mapped concept. For instance, if the claim concept is dog, inherent elements such as legs or head are not mapped to limitation concepts, as it is assumed that such elements have to be implicitly or explicitly present in the claim in order for it to be assigned to the claim concept dog. In some embodiments, the mapped patent claims include independent claims and not dependent claims.

Figure 5:
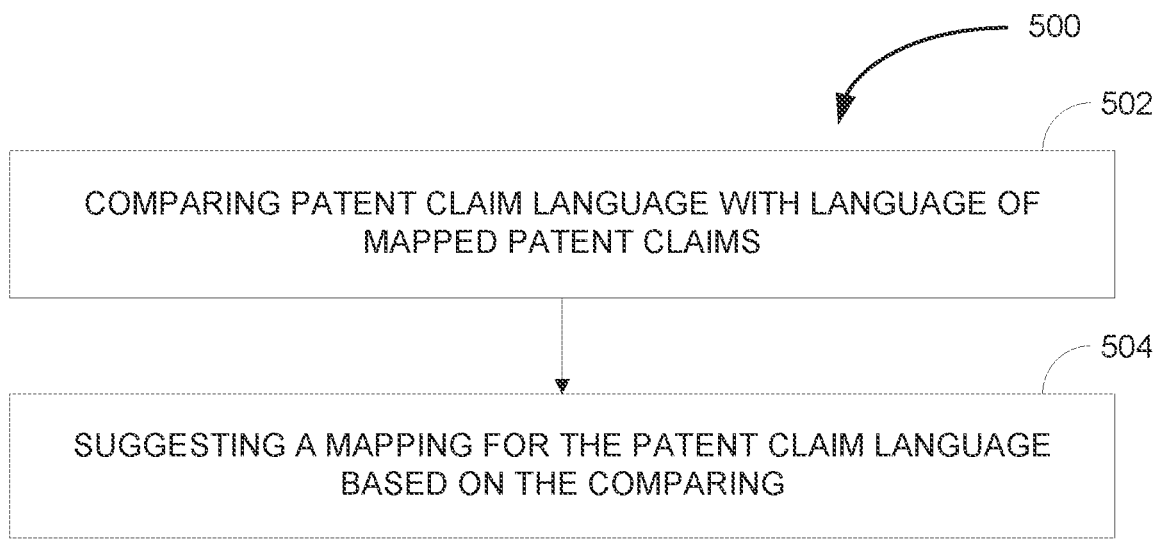
FIG. 5 is a method flow diagram of one example embodiment.

FIG. 5 is a method 500 flow diagram of one example embodiment for assisted patent mapping. The method 500 of this embodiment includes comparing patent claim language with language of mapped patent claims 502 and suggesting a mapping for the patent claim language based on the comparing 504. In some other embodiments, the claim language is mapped according to a concept schema. In such embodiments, the claim language is compared against and mapped according to concept definitions. In some further embodiments, claim language is compared against both concept definitions and previously mapped claim language.

Figure 6:
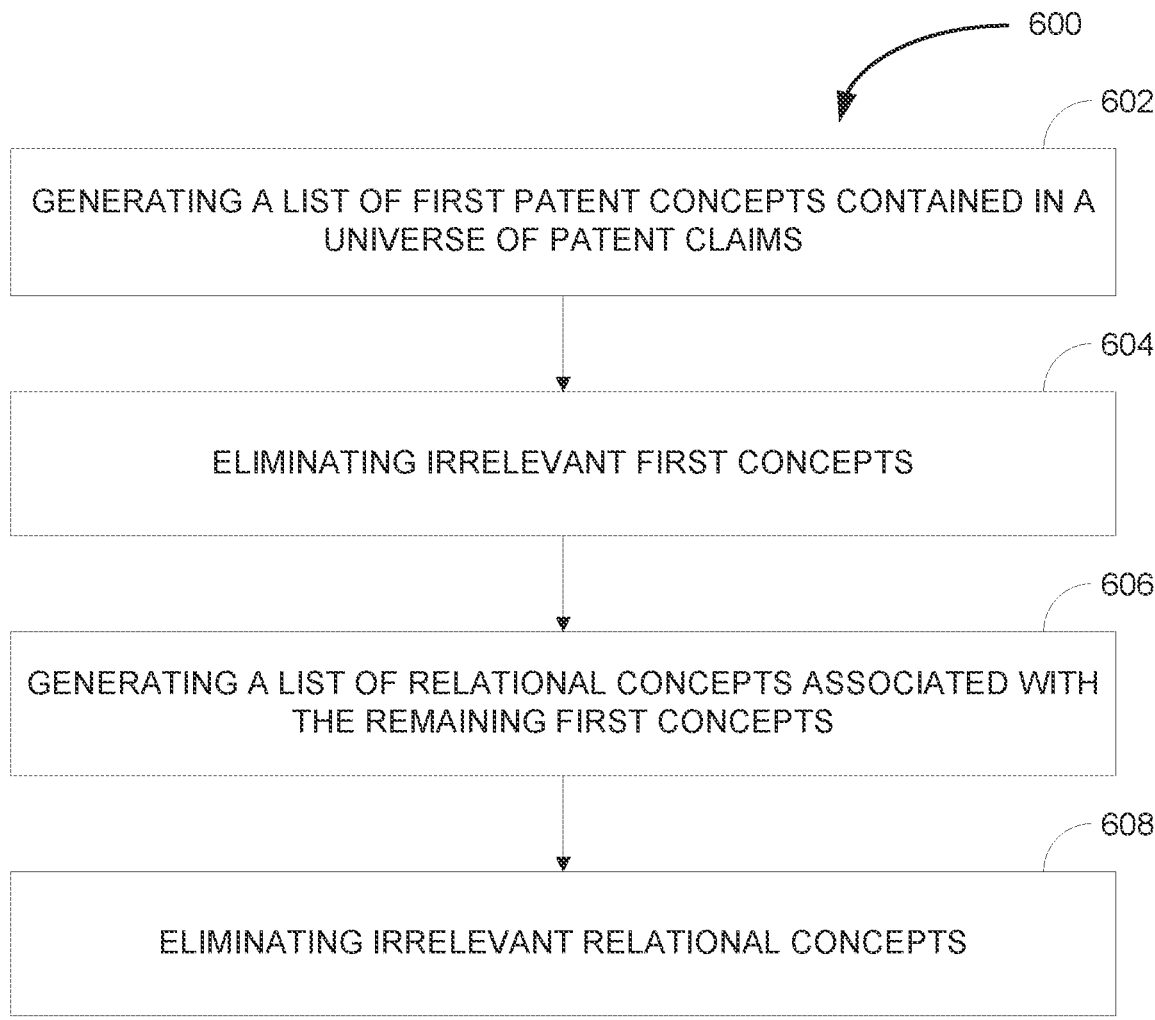
FIG. 6 is a method flow diagram of one example embodiment.

FIG. 6 is a method 600 flow diagram of one example embodiment for screening a universe or pool of patent documents. This pool may be arbitrarily selected from the available universe of mapped claims or patent documents. The method 600 includes generating a list of first claim or limitation concepts contained in the universe of patent claims 602 and eliminating irrelevant concepts 604. This embodiment further includes generating a list of remaining first concepts showing relationships, where applicable, between them 606 and eliminating irrelevant related concepts 608.

In some embodiments of the method 600, first concepts associated solely with eliminated relational concepts are eliminated upon elimination of the relational concept.

It is understood that the above description is intended to be illustrative, and not restrictive. Many other embodiments will be apparent to those of skill in the art upon reviewing the above description. The scope of the inventive subject matter should, therefore, be determined with reference to the appended claims, along with the full scope of equivalents to which such claims are entitled.

The invention claimed is:

1. A non-transitory machine-readable medium including instructions that, when executed on a processor, cause the processor to perform operations including:
   identifying a plurality of patent documents and at least some patent claims included in each patent document;
   generating a list of concepts associated with the plurality of patent documents and the at least some of the patent claims;
   screening the list of concepts with respect to a target subject matter;
   filtering at least one concept from the list of concepts based on the screening;
   generating a screening data structure entity comprising outputs from the screening, the outputs comprising a status for each concept of the list of concepts, a list of one or more patent claim of the at least some of the patent claims not applicable to the target subject matter, a list of patent documents of the plurality of patent documents that are not applicable to the target subject matter;
   annotating a concept filtered out of the list of concepts, a patent claim of the one or more patent claim, or a patent document of the list of patent documents by associating the screening data structure with the concept filtered out, the patent claim, or the patent document; and
   storing the filtered list of concepts in a data structure in a memory storage device.

2. The non-transitory machine-readable medium of claim 1, wherein the operations further include performing a mapping to map the patent claim to concepts of the list of concepts.

3. The non-transitory machine-readable medium of claim 2, wherein the operations further include responsive to filtering at least one concept from the list of concepts, marking patent claims mapped to the respective concept as irrelevant.

4. The non-transitory machine-readable medium of claim 1, wherein the target subject matter includes patentable subject matter including at least one of a method, an apparatus, or a composition of matter.

5. The non-transitory machine-readable medium of claim 1, wherein the operations further comprise generating a display, for display on a user interface device, for displaying items of the list of concepts.

6. The non-transitory machine-readable medium of claim 5, wherein the operations further include receiving user indication as to whether items of the list of concepts are found in the target subject matter.

7. The non-transitory machine-readable medium of claim 6, wherein the operations further include removing, from the data structure, concepts of the list of concepts that are indicated as not found in the target subject matter.

8. The non-transitory machine-readable medium of claim 1 wherein the operations further include enabling a user to either choose an existing concept or add a new concept for mapping.

9. A system comprising:
   at least one processor; and
   memory including instructions that, when executed by the at least one processor, cause the at least one processor to perform operations to:
   identify a plurality of patent documents from a patent database and at least some patent claims included in each patent document;
   generate a list of concepts associated with the plurality of patent documents and the at least some of the patent claims;
   screen the list of concepts with respect to a target subject matter;
   filter at least one concept from the list of concepts based on the screening;
   generate a screening data structure entity comprising outputs from the screening, the outputs comprising a status for each concept of the list of concepts, a list of one or more patent claim of the at least some of the patent claims not applicable to the target subject matter, a list of patent documents of the plurality of patent documents that are not applicable to the target subject matter;
   annotate a concept filtered out of the list of concepts, a patent claim of the one or more patent claim, or a patent document of the list of patent documents by associating the screening data structure with the concept filtered out, the patent claim, or the patent document; and
   store the filtered list of concepts in a data structure in a memory storage device.

10. The system of claim 9, the memory further including instructions that, when executed by the at least one processor, cause the at least one processor to perform operations to perform a mapping to map the patent claims to concepts of the list of concepts.

11. The system of claim 10, the memory further including instructions that, when executed by the at least one processor, cause the at least one processor to perform operations to, responsive to filtering at least one concept from the list of concepts, mark patent claims mapped to the respective concept as irrelevant.

12. The system of claim 9, wherein the target subject matter includes patentable subject matter including at least one of a method, an apparatus, or a composition of matter.

13. The system of claim 9, the memory further including instructions that, when executed by the at least one processor, cause the at least one processor to perform operations to generate a display, for display on a user interface device, for displaying items of the list of concepts.

14. The system of claim 13, the memory further including instructions that, when executed by the at least one processor, cause the at least one processor to perform operations to receive user indication as to whether items of the list of concepts are found in the target subject matter.

15. The system of claim 14, the memory further including instructions that, when executed by the at least one processor, cause the at least one processor to perform operations to remove, from the data structure, concepts of the list of concepts that are indicated as not found in the target subject matter.

16. The system of claim 9, the memory further including instructions that, when executed by the at least one processor, cause the at least one processor to perform operations to enable a user of the system to either choose an existing concept or add a new concept for mapping.

17. A method comprising:
   identifying a plurality of patent documents from a patent database and at least some patent claims included in each patent document;
   generating a list of concepts associated with the plurality of patent documents and the at least some of the patent claims;
   screening the list of concepts with respect to a target subject matter;
   filtering at least one concept from the list of concepts based on the screening;
   generating a screening data structure entity comprising outputs from the screening, the outputs comprising a status for each concept of the list of concepts, a list of one or more patent claim of the at least some of the patent claims not applicable to the target subject matter, a list of patent documents of the plurality of patent documents that are not applicable to the target subject matter;
   annotating a concept filtered out of the list of concepts, a patent claim of the one or more patent claim, or a patent document of the list of patent documents by associating the screening data structure with the concept filtered out, the patent claim, or the patent document; and
   storing the filtered list of concepts in a data structure in a memory storage device.

18. The method of claim 17, further comprising performing a mapping to map the patent claims to concepts of the list of concepts.

19. The method of claim 18, further comprising, responsive to filtering at least one concept from the list of concepts, marking patent claims mapped to the respective concept as irrelevant.

20. The method of claim 17, wherein the target subject matter includes patentable subject matter including at least one of a method, an apparatus, or a composition of matter.

* * * * *

UNITED STATES PATENT AND TRADEMARK OFFICE
CERTIFICATE OF CORRECTION

| | |
|---|---|
| PATENT NO. | : 12,380,525 B2 |
| APPLICATION NO. | : 18/238325 |
| DATED | : August 5, 2025 |
| INVENTOR(S) | : Lundberg et al. |

Page 1 of 1

It is certified that error appears in the above-identified patent and that said Letters Patent is hereby corrected as shown below:

On the Title Page

In Column 1, under "Related U.S. Application Data", Line 1, delete "(60)" and insert --(63)-- therefor On page 4, in Column 1, under "Other Publications", Line 27, delete "Noon" and insert --Non-- therefor On page 6, in Column 1, under "Other Publications", Lines 25-26, delete "Jun. 26, 2015 t"," and insert --Jun. 26, 2015",-- therefor Signed and Sealed this
Ninth Day of December, 2025

John A. Squires
*Director of the United States Patent and Trademark Office*